(12) United States Patent
Truitt et al.

(10) Patent No.: US 11,471,017 B2
(45) Date of Patent: Oct. 18, 2022

(54) VACUUM CLEANER AND VACUUM CLEANING SYSTEM IN WIRELESS COMMUNICATION WITH A USER-CONTROLLED ELECTRONIC DEVICE

(71) Applicant: TTI (Macao Commercial Offshore) Limited, Macau (CN)

(72) Inventors: Patrick Truitt, Concord, NC (US); Todd Zimmerman, Charlotte, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 355 days.

(21) Appl. No.: 16/489,962

(22) PCT Filed: Mar. 2, 2018

(86) PCT No.: PCT/US2018/020735
§ 371 (c)(1),
(2) Date: Aug. 29, 2019

(87) PCT Pub. No.: WO2018/161011
PCT Pub. Date: Sep. 7, 2018

(65) Prior Publication Data
US 2019/0387942 A1     Dec. 26, 2019

Related U.S. Application Data

(60) Provisional application No. 62/466,512, filed on Mar. 3, 2017, provisional application No. 62/466,518, filed on Mar. 3, 2017.

(51) Int. Cl.
   *A47L 9/28*     (2006.01)
   *A47L 5/30*     (2006.01)
   *A47L 9/04*     (2006.01)

(52) U.S. Cl.
CPC ............... *A47L 9/2831* (2013.01); *A47L 5/30* (2013.01); *A47L 9/0411* (2013.01);
(Continued)

(58) Field of Classification Search
CPC .......... A47L 5/30; A47L 9/009; A47L 9/0411; A47L 9/28; A47L 9/2821; A47L 9/2826;
(Continued)

(56) References Cited

U.S. PATENT DOCUMENTS

2005/0278888 A1* 12/2005 Reindle ................. A47L 9/2805
   15/319
2012/0152280 A1* 6/2012 Bosses .................. A47L 9/2857
   134/6

(Continued)

FOREIGN PATENT DOCUMENTS

| CN | 1493434 A | 5/2004 |
| CN | 1956673 A | 5/2007 |

(Continued)

OTHER PUBLICATIONS

Chinese Patent Office Action for Application No. 201880015425.6 dated May 18, 2021 (9 pages including statement of relevance).

(Continued)

*Primary Examiner* — Marc Carlson
(74) *Attorney, Agent, or Firm* — Michael Best & Friedrich LLP

(57) ABSTRACT

A vacuum cleaner includes a base defining a suction chamber, a brushroll driven by a brushroll motor, a transmitter and a receiver both of which are in wireless communication with a user-controlled electronic device, and a controller in communication with the transmitter, the receiver, the brushroll sensor, and the floor sensor. The controller controls the brushroll motor. The controlling the brushroll motor (Continued)

includes controlling the brushroll motor to a first value or a second value based on a user selected factor.

21 Claims, 10 Drawing Sheets

(52) U.S. Cl.
CPC ........... *A47L 9/2821* (2013.01); *A47L 9/2826* (2013.01); *A47L 9/2857* (2013.01); *A47L 9/2894* (2013.01)

(58) Field of Classification Search
CPC .... A47L 9/2831; A47L 9/2842; A47L 9/2847; A47L 9/2857; A47L 9/2894
See application file for complete search history.

(56) References Cited

U.S. PATENT DOCUMENTS

| | | | | |
|---|---|---|---|---|
| 2014/0196245 A1* | 7/2014 | Liter | ..................... | A47L 9/2894 15/339 |
| 2015/0000068 A1* | 1/2015 | Tsuboi | ..................... | A47L 9/19 15/319 |
| 2015/0032260 A1* | 1/2015 | Yoon | ................... | G05D 1/0016 700/257 |
| 2016/0000288 A1* | 1/2016 | Soejima | ................ | A47L 9/2831 15/319 |
| 2016/0022106 A1* | 1/2016 | Liter | ..................... | G05B 15/02 15/339 |
| 2016/0274579 A1* | 9/2016 | So | ......................... | G05D 1/0016 |
| 2017/0361468 A1* | 12/2017 | Cheuvront | ........... | B25J 11/0085 |
| 2018/0368642 A1* | 12/2018 | Son | ....................... | A47L 9/2826 |
| 2018/0373242 A1* | 12/2018 | Han | ...................... | A47L 9/2894 |
| 2020/0064838 A1* | 2/2020 | Izawa | .................. | G05D 1/0274 |
| 2021/0283773 A1* | 9/2021 | Ahn | ..................... | B25J 11/0085 |

FOREIGN PATENT DOCUMENTS

| | | |
|---|---|---|
| CN | 101035456 A | 9/2007 |
| CN | 101273307 A | 9/2008 |
| JP | H1057287 A | 3/1998 |

OTHER PUBLICATIONS

European Patent Office Examination Report for Application No. 18712338.5 dated Jun. 1, 2021 (4 pages).
Chinese Patent Office Action for Application No. 201880015425.6 dated Nov. 23, 2020 (10 pages).
International Search Report and Written Opinion for Application No. PCT/US2018/020735, dated Aug. 3, 2018, 14 pages.
International Preliminary Report on Patentability for Application No. PCT/US2018/020735 dated Sep. 3, 2019 (8 pages).

* cited by examiner

VACUUM CLEANER AND VACUUM CLEANING SYSTEM IN WIRELESS COMMUNICATION WITH A USER-CONTROLLED ELECTRONIC DEVICE

CROSS-REFERENCE TO RELATED APPLICATIONS

This application claims priority to U.S. Provisional Application No. 62/466,512, filed Mar. 3, 2017 and to U.S. Provisional Application No. 62/466,518, filed Mar. 3, 2017, the entire contents both of which are hereby incorporated by reference herein.

BACKGROUND

The present invention relates to vacuum cleaners, and more particularly to vacuum cleaners in wireless communication with a user-controlled electronic device.

SUMMARY

In one aspect, the invention provides a vacuum cleaner. The vacuum cleaner includes a base defining a suction chamber, a user-manipulatable handle coupled to the base, the handle for moving the base with respect to a surface, a brushroll driven by a brushroll motor, a brushroll sensor configured to respond to a first parameter related to the brushroll, a transmitter and a receiver both of which for wireless communication with a user-controlled electronic device, and a controller in communication with the transmitter, the receiver, and the brushroll sensor. The controllers receive a first communication from the electronic device providing a first value for the first parameter corresponding to a first user-selected factor control the brushroll motor to the first value.

In another aspect, the invention provides a vacuum cleaning system. The vacuum cleaning system includes the vacuum cleaner and the user-controlled electronic device in wireless communication with the vacuum cleaner.

In yet another aspect, the invention provides a method of controlling a brushroll in a vacuum cleaner in wireless communication with a user-controlled electronic device.

In yet another aspect, the invention provides a vacuum cleaner including a base defining a suction chamber, a motorized wheel coupled to the base, the wheel for moving the base with respect to a surface. The vacuum further includes a brushroll driven by a brushroll motor, a brushroll sensor configured to respond to a first parameter related to the brushroll, a transmitter and a receiver both of which for wireless communication with a user-controlled electronic device, and a controller in communication with the transmitter, the receiver, and the brushroll sensor. The controller receives a first communication from the electronic device providing a first value for the first parameter corresponding to a first user-selected factor and controls the brushroll motor to the first value.

In yet another aspect, the invention provides a non-transitory computer-readable medium comprising executable instructions for directing a processor of a user-controlled electronic device to perform a method. The method includes establishing a communication channel with a robotic vacuum cleaner. The vacuum cleaner includes a brushroll driven by a brushroll motor, a brushroll sensor configured to respond to a first parameter related to the brushroll, a transmitter and a receiver both of which for wireless communication with the electronic device, and a controller in communication with the transmitter, the receiver, and the brushroll sensor. The method further includes communicating a first communication providing a first value for a first parameter corresponding to a first user-selected factor, the first communication for causing the controller to control the brushroll motor to the first value during operation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
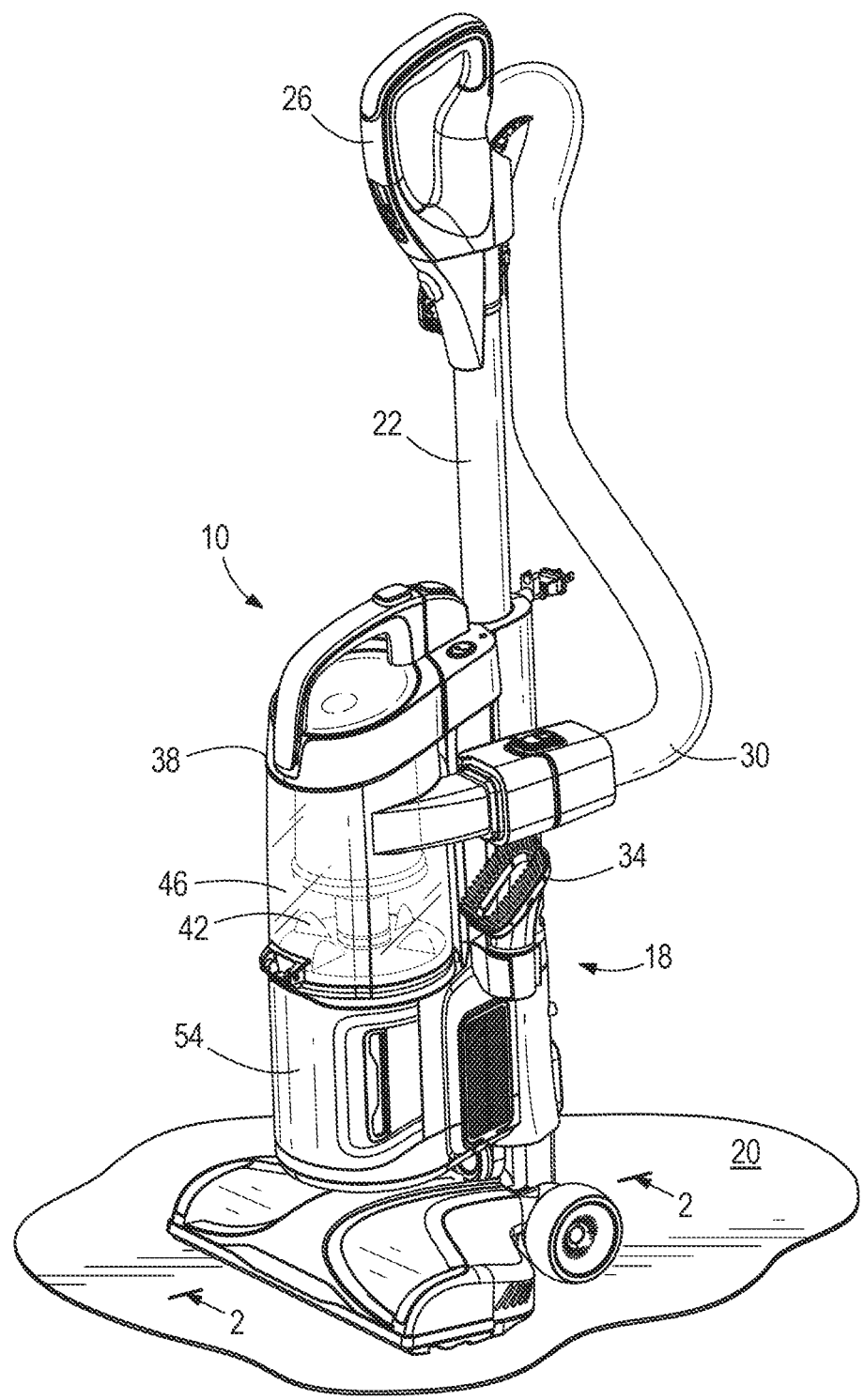
FIG. 1 is a perspective view of a vacuum cleaner according to an embodiment of the invention.

FIG. 1 illustrates an exemplary vacuum cleaner 10. The vacuum cleaner 10 is an upright vacuum cleaner and includes a base assembly 14 and a handle assembly 18 pivotally coupled to the base assembly 14. In other embodiments, other types and styles of vacuum cleaners can be utilized (e.g., canister, handheld, utility, etc., which could be dirty air systems or clean air systems).

In the illustrated embodiment of the vacuum cleaner 10, the base assembly 14 is movable along a surface 20 to be cleaned, such as a carpeted or hard-surface floor. The handle assembly 18 extends from the base assembly 14 and allows a user to move and manipulate the base assembly 14 along the surface. The handle assembly 18 is also movable relative to the base assembly 14 between an upright position (FIG. 1) and an inclined position.

The handle assembly 18 includes a maneuvering handle 22 having a grip 26 for a user to grasp and maneuver the vacuum cleaner 10. In the illustrated embodiment, the vacuum cleaner 10 also includes a detachable wand 30. An accessory tool 34 (e.g., a crevice tool, an upholstery tool, a pet tool, etc.) is detachably coupled to the handle assembly 18 for storage and may be used with the wand 30 for specialized cleaning.

A canister 38 is supported on the handle assembly 18 and includes a separator 42 and a dirt cup 46. The separator 42 removes dirt particles from an airflow drawn into the vacuum cleaner 10 that are then collected by the dirt cup 46. The separator 42 may be a cyclonic separator, filter bag, or other separator as desired The vacuum cleaner 10 further includes a suction motor contained within a motor housing 54 and a suction source, such as an impeller fan assembly, driven by the suction motor. The suction motor selectively receives power from a power source (e.g., a cord for plugging into a source of utility power, a battery, etc.) to generate the suction airflow through the vacuum cleaner 10.

Figure 2:
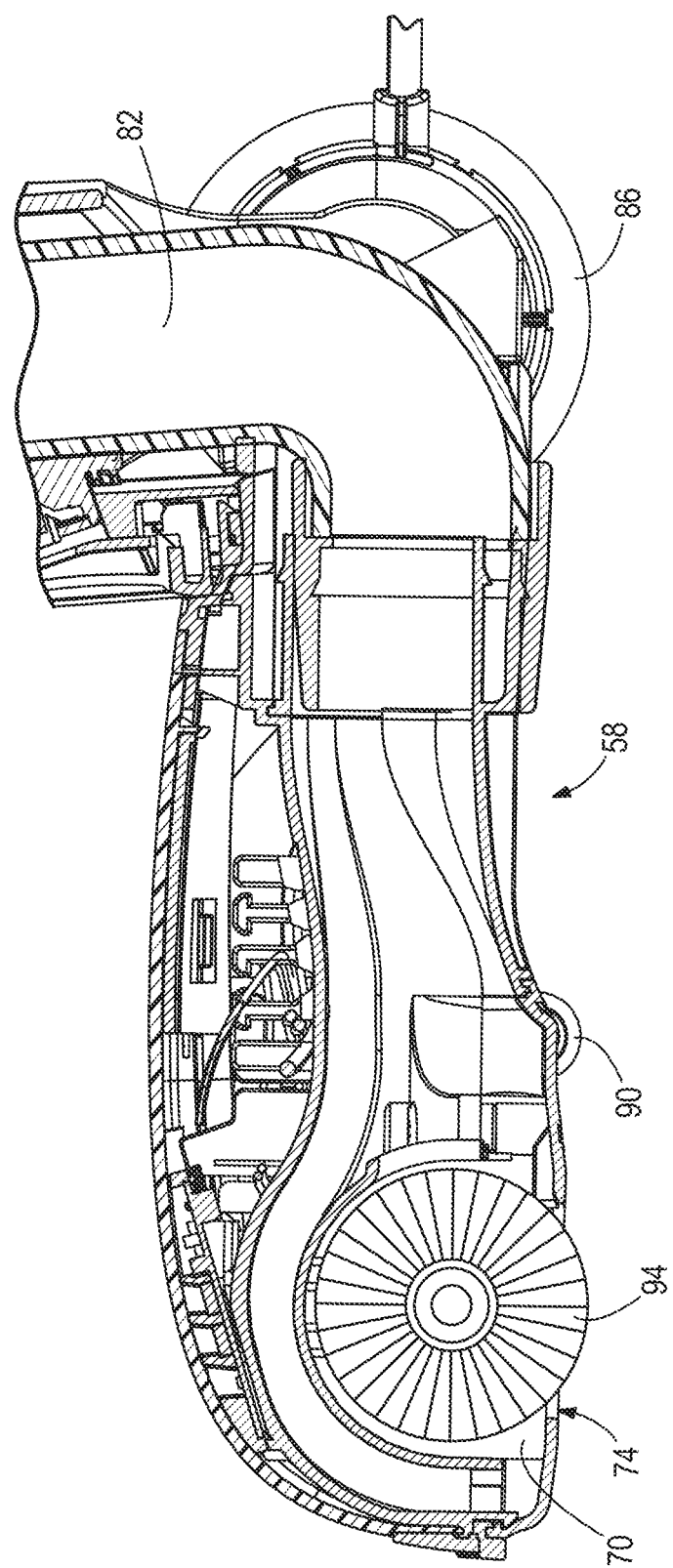
FIG. 2 is a sectional view of a base of the vacuum cleaner of FIG. 1, with a portion removed.

Now referring to FIG. 2, the base assembly 14 includes a floor nozzle 58 having a suction chamber 70. Air and debris may be drawn into the suction chamber 70 through an inlet opening 74. After entering the suction chamber 70, air and debris pass through a nozzle outlet 82 that fluidly communicates with the separator 42.

Optionally, the base assembly 14 includes a pair of rear wheels 86 and a pair of forward supporting elements or wheels 90 spaced from the rear wheels 86 and located generally adjacent the inlet opening 74. The wheels 86, 90 facilitate movement of the base assembly 14 along the surface to be cleaned. For certain vacuums, e.g., a robot vacuum, the wheels 86 and/90 may be motorized.

An agitator or brushroll 94 is rotatably supported within the nozzle suction chamber 70. The agitator 94 is rotatably driven by a drive belt that receives power from a brushroll motor. The brushroll motor drives the brushroll 94, while the suction motor drives the suction source.

The floor nozzle 58 may also include a pressure sensor. The pressure sensor can be in communication with the suction chamber 70 for determining a nozzle suction pressure within the floor nozzle 58. Alternatively, the pressure sensor can be used to determine a nozzle suction pressure in other types of nozzles, such as an accessory wand or other above-floor cleaning attachment.

In general operation, the suction motor drives the fan assembly or suction source to generate airflow through the vacuum cleaner 10. The airflow enters the floor nozzle 58 through the inlet opening 74 and flows into the suction chamber 70. The airflow and any debris entrained therein then travel through the nozzle outlet 82 and into the separator 42. After the separator 42 filters or otherwise cleans the airflow, the cleaned airflow is directed out of the canister 38 and into the motor housing 54, (e.g., through an airflow channel extending through the handle assembly 18). The cleaned airflow is ultimately exhausted back into the environment through air outlet openings.

Figure 3:
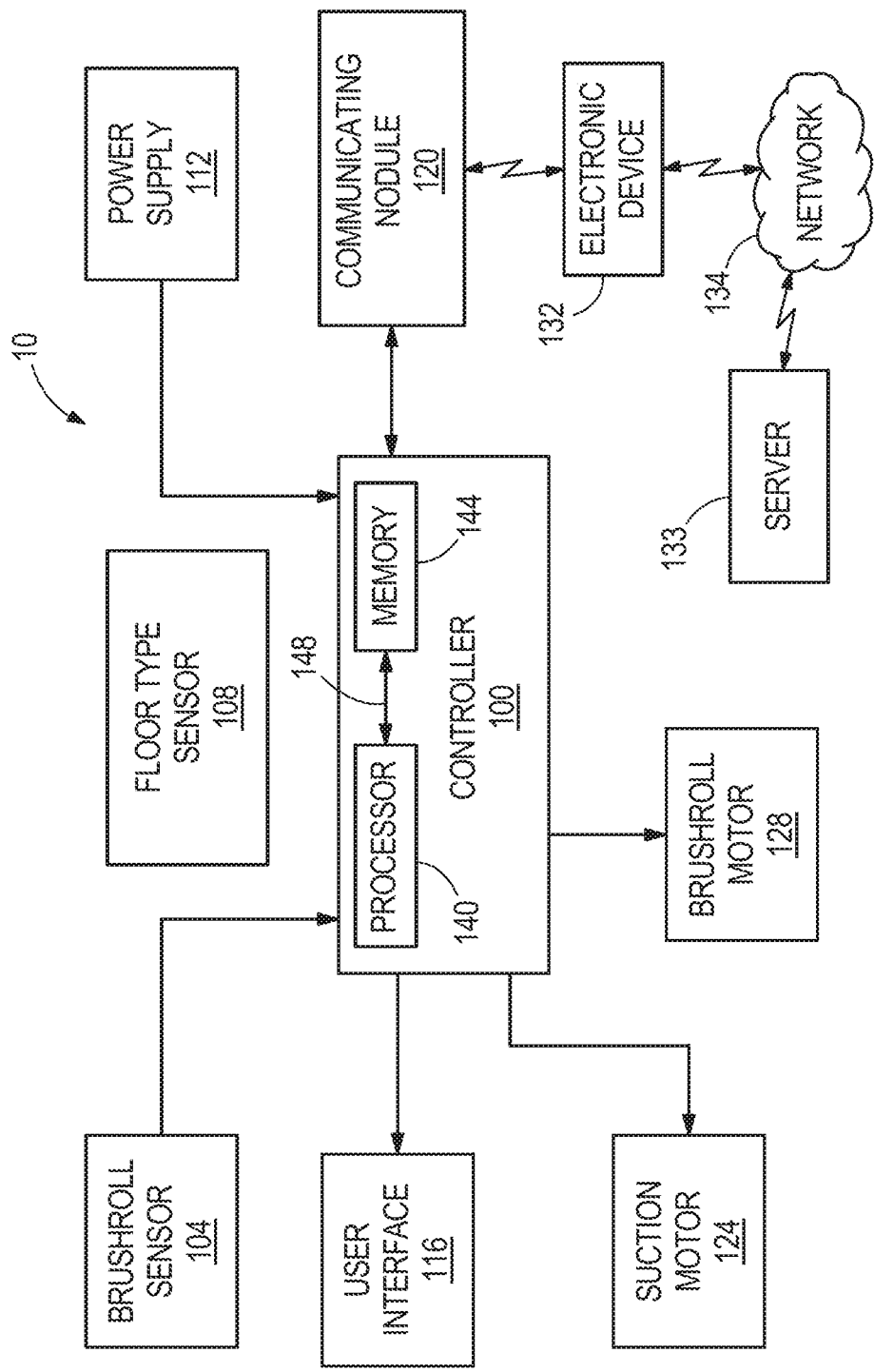
FIG. 3 is a block diagram of a portion of the electrical components of a vacuum cleaner system including the vacuum cleaner of FIG. 1

With reference again to FIG. 3, the vacuum includes a controller 100, a plurality of sensors 104 and 108, a power supply module 112, a user interface 116, and a communications module 120, the suction motor 124, and the brushroll motor 128. The controller 100 can communicate with an external, user-controlled electronic device 132 (e.g., a smart device such as a smart phone or tablet). The controller 100 includes combinations of software and hardware that are operable to, among other things, control the operation of the vacuum, control the communication with the electronic device 132, receive input from the sensors 104 and 108, receive input or provide output with the user interface 116, and control the motors 124 and 128.

In one construction, the controller 100 includes a printed circuit board ("PCB") that is populated with a plurality of electrical and electronic components that provide, power, operational control, and protection to the vacuum 10. In some constructions, the PCB includes, for example, a processing unit 140 (e.g., a microprocessor, a microcontroller, or another suitable programmable device), a memory 144, and a bus 148. The bus 148 connects various components of the PCB including the memory 144 to the processing unit 140. The memory 148 includes, for example, a read-only memory ("ROM"), a random access memory ("RAM"), an electrically erasable programmable read-only memory ("EEPROM"), a flash memory, or another suitable magnetic, optical, physical, or electronic memory device. The processing unit 140 is connected to the memory 144 and executes instructions (e.g., software) that is capable of being stored in the RAM (e.g., during execution), the ROM (e.g., on a generally permanent basis), or another non-transitory computer readable medium such as another memory or a disc. Additionally or alternatively, the memory 144 is included in the processing unit 140 (e.g., as part of a microcontroller).

Software included in the implementation of the vacuum cleaner 10 is stored in the memory 144 of the controller 100. The software includes, for example, firmware, program data, one or more program modules, and other executable instructions. The controller 100 is configured to retrieve from memory and execute, among other things, instructions related to the control processes and methods described herein.

The PCB also includes, among other things, a plurality of additional passive and active components such as resistors, capacitors, inductors, integrated circuits, and amplifiers. These components are arranged and connected to provide a plurality of electrical functions to the PCB including, among other things, signal conditioning or voltage regulation. For descriptive purposes, the PCB and the electrical components populated on the PCB are collectively referred to as the controller 100.

The user interface 116 is included to control the vacuum cleaner 10. The user interface 116 can include any combination of digital and analog input devices required to control the vacuum 10. For example, the user interface 116 can be include a display and input devices, or the like. The user interface 116 can be as simple is an LED indicating operation of the vacuum cleaner 10 and a switch for activating/deactivating the vacuum cleaner 10.

The power supply module 112 supplies a nominal AC or DC voltage to the vacuum cleaner 10. The power supply module 112 is powered by mains or a battery power. The power supply module 112 is also configured to supply lower voltages to operate circuits and components within the vacuum.

The controller 100 may operate the suction motor based on floor type. For example, the controller 100 may operate the suction motor at a lower power on a hard floor surface to conserve energy or a higher power on a hard floor surface to increase debris pick-up. In some embodiments, the suction motor may be operated at a lower power on certain height carpets to reduce the clamp-down of the nozzle to the carpet so that the vacuum cleaner 10 is easier to push.

In one implementation, by continuously or intermittently monitoring a sensor 104 relating to the brushroll and/or a sensor 108 to the floor type, the controller 100 determines when the vacuum cleaner 10 passes from one surface type to another surface type and alters the brushroll speed, suction, or a combination of suction and brushroll speed, to provide a programmed vacuum cleaner operation in response to the different conditions created by different floor types. Either or both of the brushroll sensor 104 or floor type sensor 108 may be continually used to alter the rotational speed of the brushroll motor 108 and/or suction motor 124.

The brushroll sensor 104 refers to a sensor that senses a parameter related directly or indirectly to an aspect of the brushroll. The brushroll sensor 104 can be a tachometer for sensing a revolutions per minute (RPM) value of the brushroll 94, a tachometer for sensing an RPM value of the brushroll motor 128, an electrical sensor for sensing an electrical parameter (e.g., current or voltage) of the motor, a torque sensor for sensing a torque parameter of the motor, etc. In one embodiment, the brushroll sensor 104 is a PWM controller for the brushroll motor 108. The floor type sensor 108 refers to a sensor that senses a parameter related directly or indirectly to an aspect of the type of floor. The floor type sensor 108 can be a pressure sensor for sensing a pressure within the vacuum, a current sensor for sensing a current of the motor, and so. It is envisioned that the number of sensors 104 and 108 can be greater than only the two sensors shown. For example, the floor type sensor may require signals from both a pressure sensor and a motor current sensor to determine a parameter relating to a floor type. It is also envisioned that a sensor can provide information (e.g., signals, data) applicable to both the brushroll sensor 104 and the floor type sensor 108. For example, a motor current sensor may provide information for both a brushroll parameter and a floor type parameter.

The communications module 120 provides wireless communication to the electronic device 132. The communications module includes a receiver circuit 140 and a transmitter circuit 144, both of which are electrically connected to an antenna 148. Of course the receiver circuit 140 and the transmitter circuit 144 may be part of a transceiver. The communications module 120 may communicate with the electronic device via conventional modes of transmission (e.g., IR and/or RF) and via conventional protocols/standards of communication (e.g., Bluetooth™, WiFI™). It is also envisioned that that the communications module 120 can communicate with other devices (e.g., other computers, remote servers) directly or indirectly (e.g., over one or more networks).

In one implementation, the vacuum cleaner 10 further includes a brushroll sensor, a pressure sensor, and a controller 18 in communication with the sensors. The brushroll sensor is configured to sense a torque output or current draw of the brushroll motor 128. The controller 100 receives and analyzes signals from the pressure sensor and the brushroll motor sensor and control the rotational speed of the brushroll motor. The controller 110 receives the signals from the sensors and compares the sensed pressure from the pressure sensor and/or the sensed current and/or torque values from the brushroll motor sensor with one or more corresponding predetermined thresholds. The predetermined thresholds (i.e., pressure, torque, and/or current) are associated with different floor types to represent a distinction between floor surfaces (e.g., carpet and hard floor). The controller 110 determines the floor surface by comparing the sensed pressure and the sensed motor current and/or torque values with the predetermined thresholds, and automatically operates the brushroll motor 128, and optionally the suction motor 124, in a manner optimized for the type of floor surface. For example, a high-pile carpet will generally cause high suction (i.e., low pressure) within the suction chamber 70 and force the brushroll motor 128 to work harder (i.e., generate higher torque and draw more current), while a hard floor surface will lead to lower suction (i.e., higher pressure that is closer to atmospheric pressure) within the suction chamber 70 and will allow the brushroll motor 128 to work more easily (i.e., generate lower torque and draw less current).

While the vacuum cleaner 10 is operated in the "floor-sense" mode, the floor type sensor and the brushroll motor sensor continuously or intermittently provide sensed values representative of the suction pressure and the motor current and/or torque. When the sensed data of the pressure sensor and the brushroll motor sensor correspond to the values associated with the vacuum cleaner 10 operating on a carpet surface, or the like, the controller 110 operates the brushroll motor 128 at a first rotational speed, for example, between about 1000 and 5000 revolutions per minute (RPM), or between about 2000 and 4000 RPM. When the sensed data of the pressure sensor and the brushroll motor sensor correspond to the values associated with the vacuum cleaner 10 operating on a hard floor surface, or the like, the controller 100 operates the brushroll motor 128 at a second rotational speed that is lower than the first rotational speed, for example, between about 0 and 1000 RPM, or between about 300 and 600 RPM, or may turn off the brushroll. Either or both of the pressure sensor and the brushroll motor sensor may be continually or intermittently used to alter the rotational speed of the brushroll motor 108 in response to the sensed values.

Figure 4:
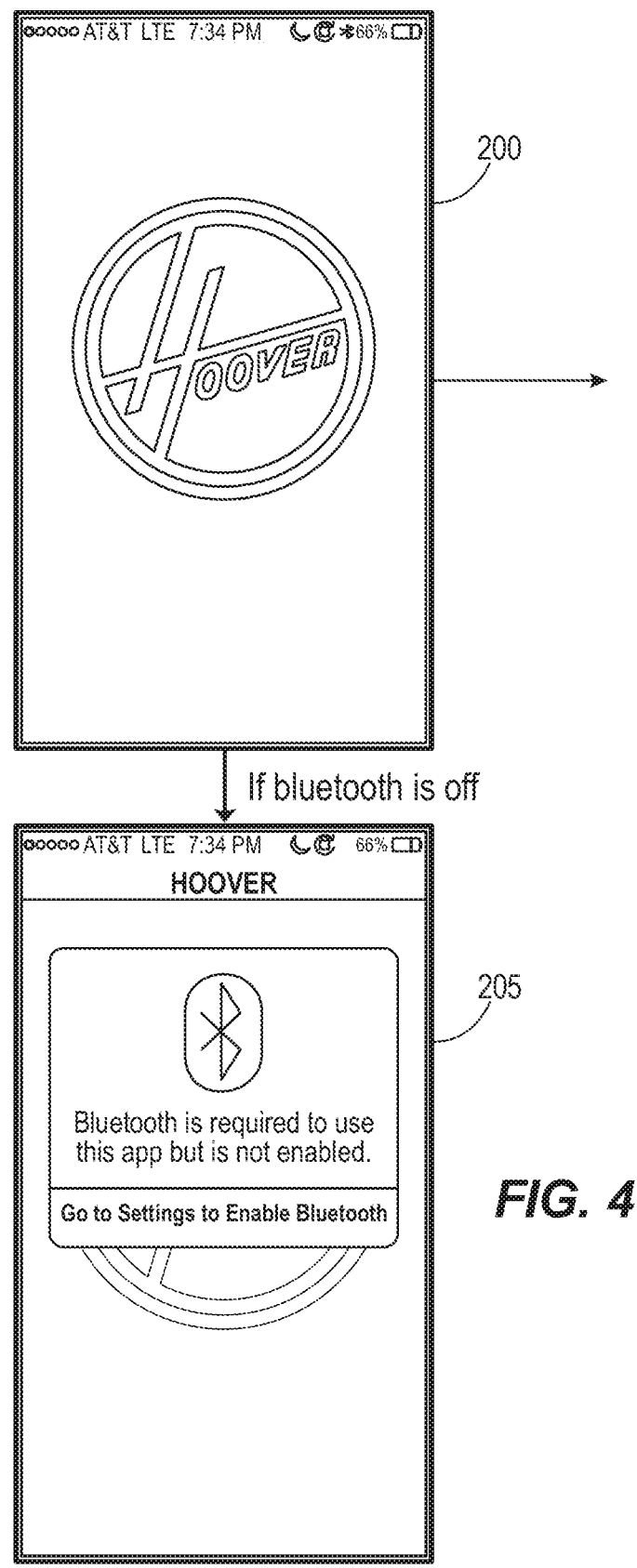
FIG. 4 is a screen shot of an application implemented by a user-controlled electronic device shown in FIG. 3.
Figure 5:
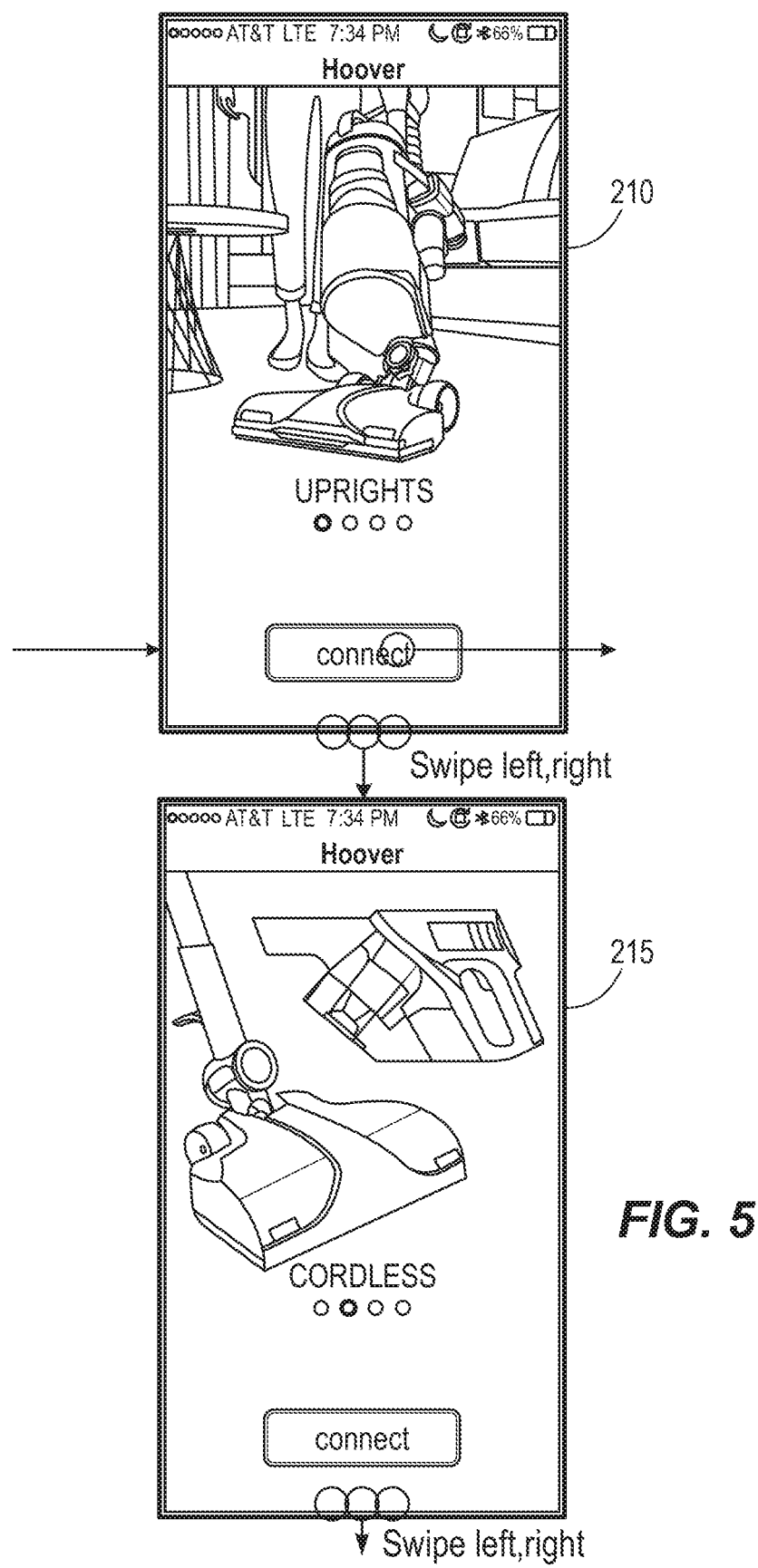
FIG. 5 is a screen shot of the application implemented by the user-controlled electronic device shown in FIG. 3.
Figure 6:
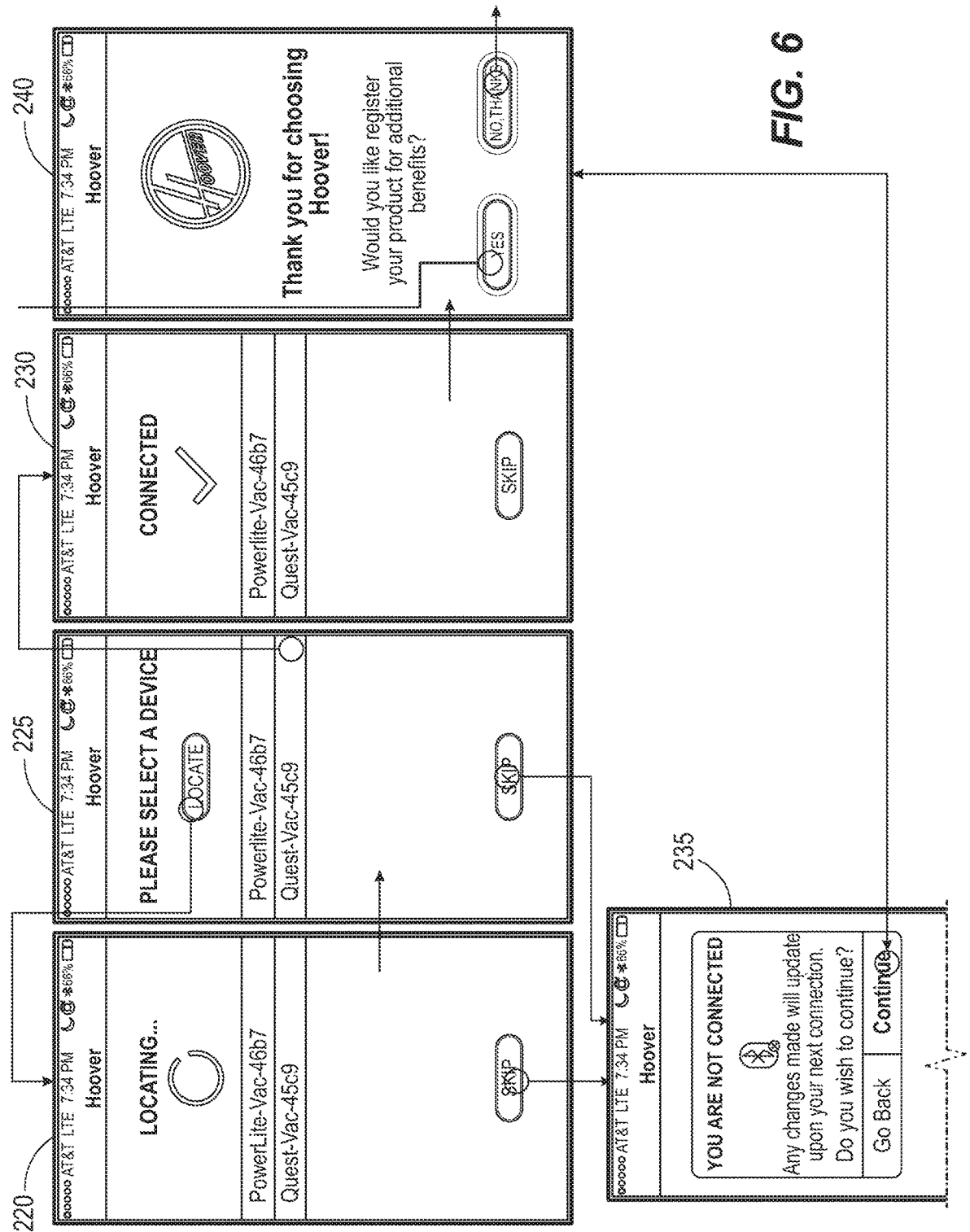
FIG. 6 is a screen shot of the application implemented by the user-controlled electronic device shown in FIG. 3.
Figure 7:
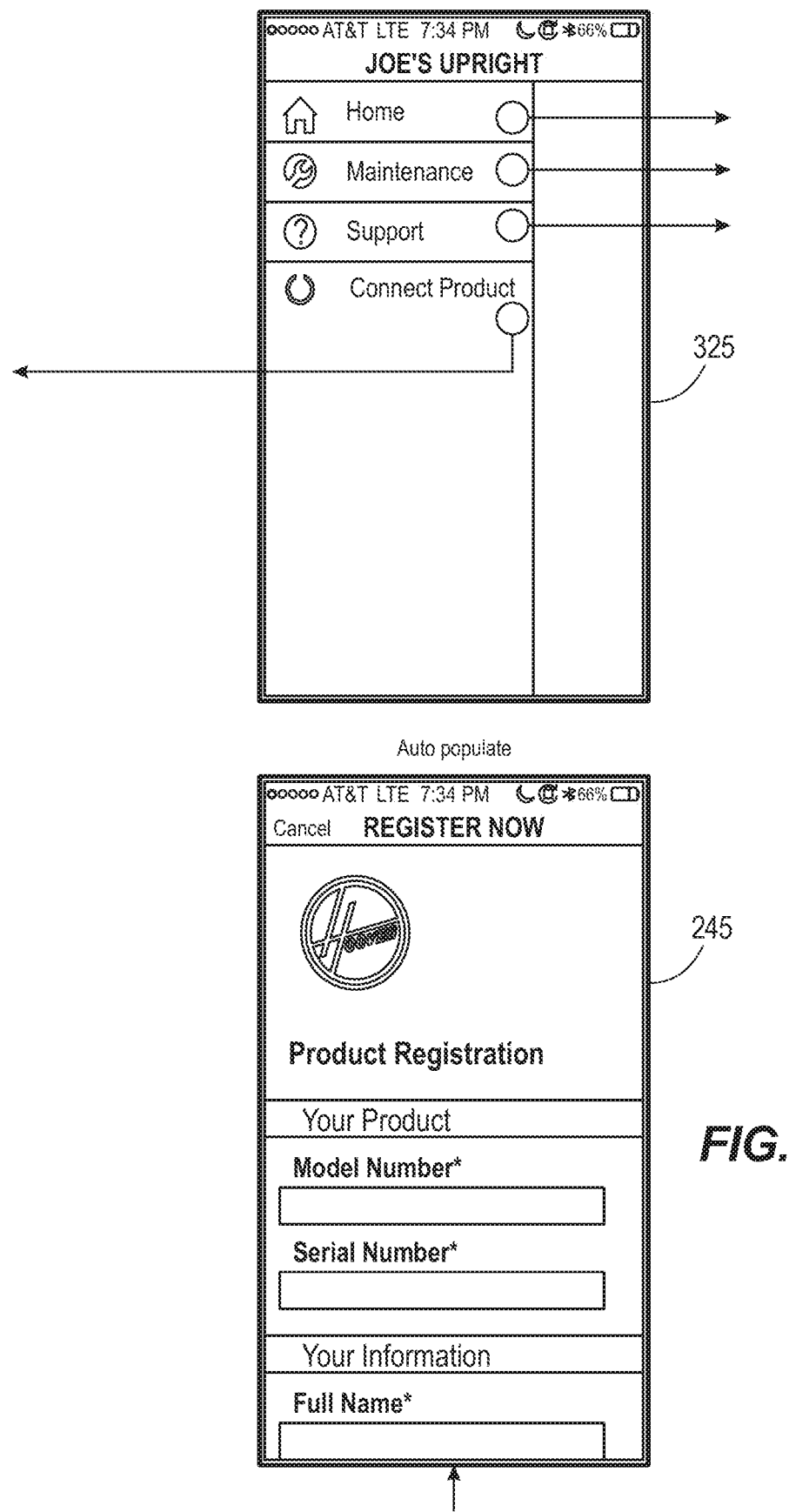
FIG. 7 is a screen shot of the application implemented by the user-controlled electronic device shown in FIG. 3.
Figure 8:
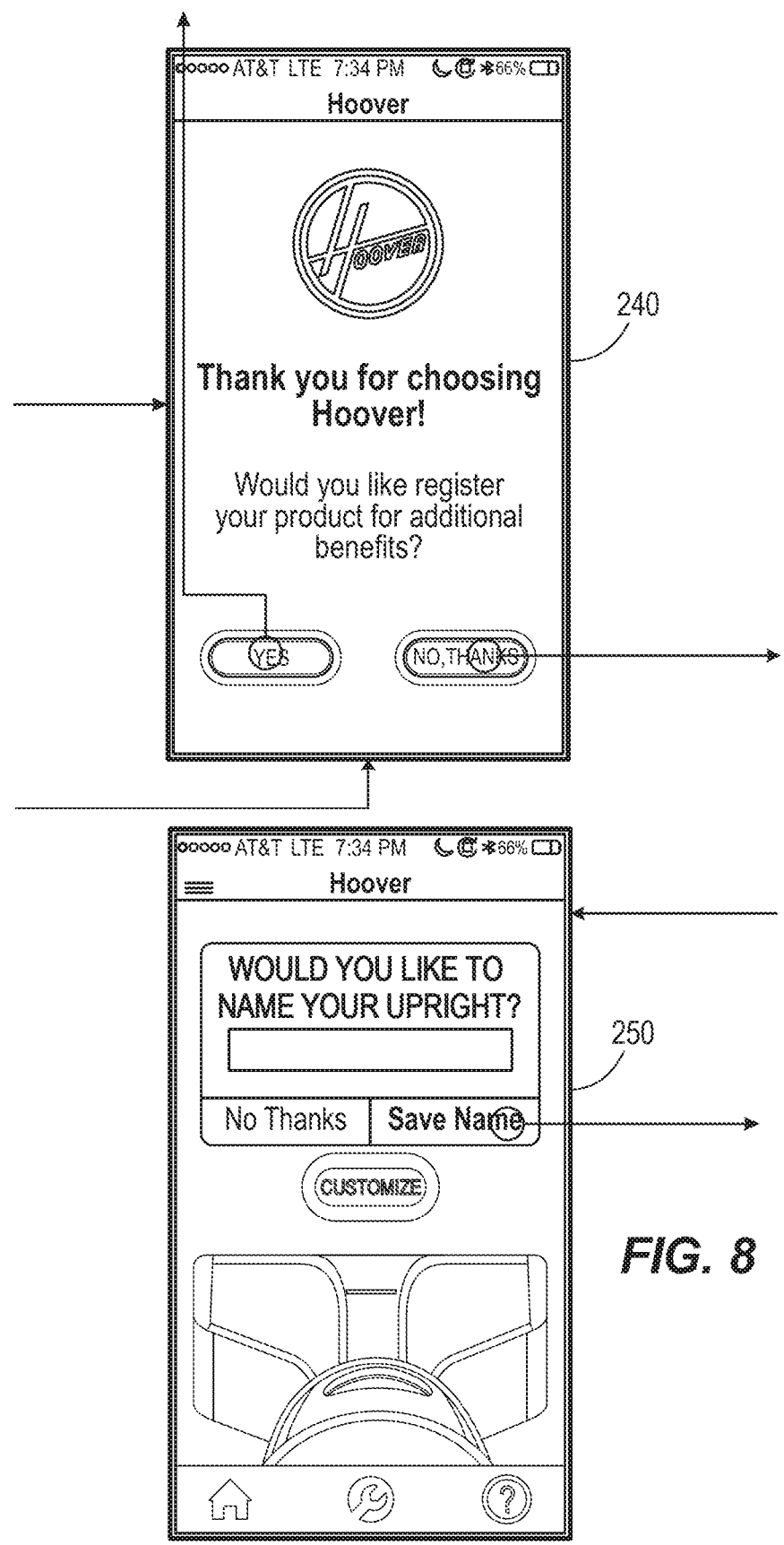
FIG. 8 is a screen shot of the application implemented by the user-controlled electronic device shown in FIG. 3.
Figure 9:
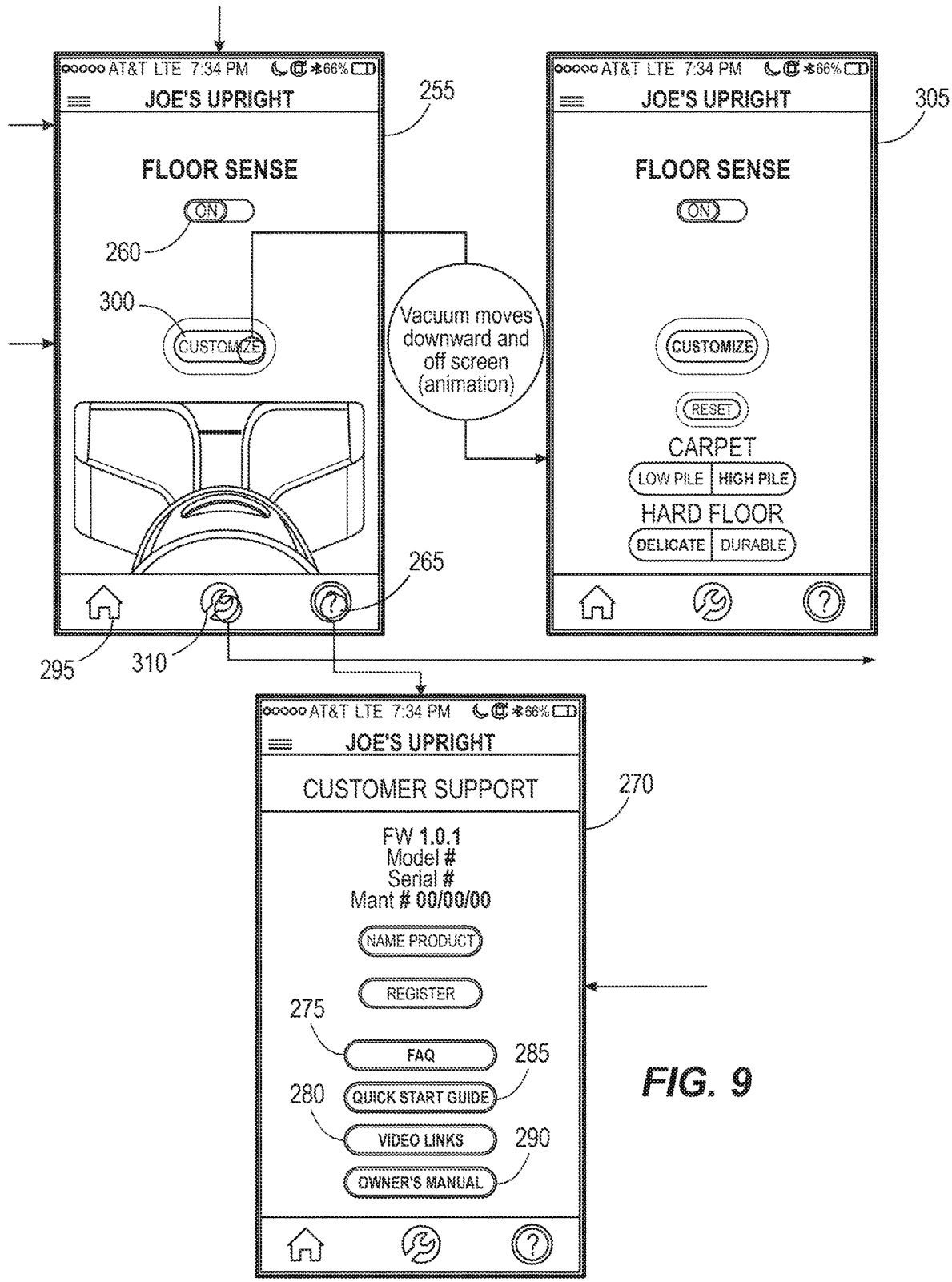
FIG. 9 is a screen shot of the application implemented by the user-controlled electronic device shown in FIG. 3.
Figure 10:
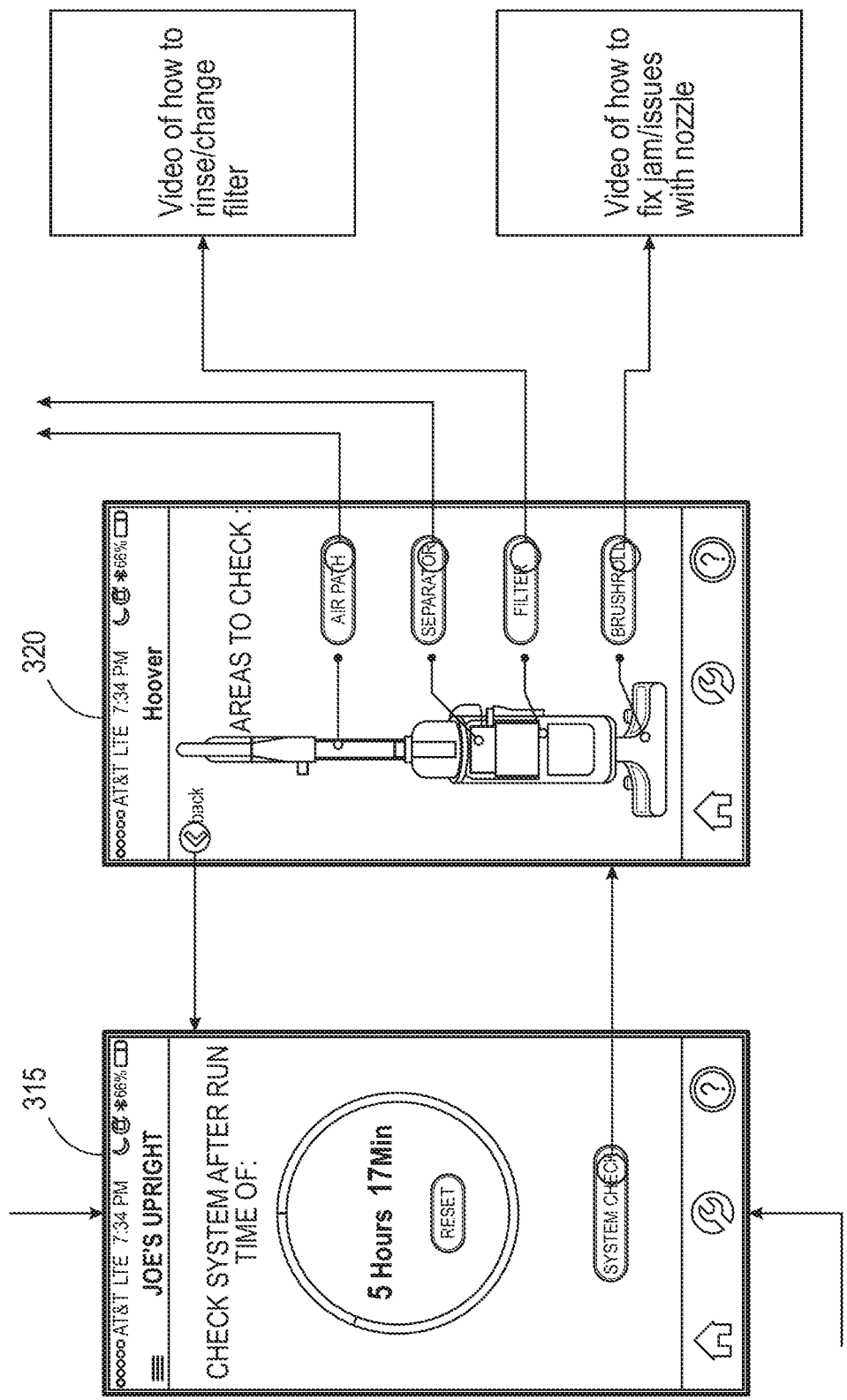
FIG. 10 is a screen shot of the application implemented by the user-controlled electronic device shown in FIG. 3.

FIGS. 4-6 show screen shots of a smart device application (or app) for use with the vacuum cleaner 10. The application is executed by the user-controlled smart device 132, which may be a smart phone. Screen shot 200 shows a home shot of the app. If communication with the vacuum cleaner is not enabled (e.g., Bluetooth™ is disabled on the phone), then the application proceed to screen shot 205. Otherwise, the application proceed to screen shot 210. At screen shot 210, the user can move through various screens (e.g., screen shots 230 are shown) to select a style (e.g., upright, cordless, robot), model, and specific vacuum cleaner and connect to that vacuum cleaner 240. At screen shots 240-250, the user can move through various screens to register and name the vacuum cleaner 100 for easier operation. The controller 110 may be programmed with the model number and serial number corresponding to the vacuum cleaner, such as by programming before, during, or after manufacturing of the vacuum cleaner. In one embodiment, the controller transmits the model number and serial number to the app. In this alternative, the application is programmed to display information on the electronic device 132 based on the model number, the serial number, or both. For example, the app would know the model number of the vacuum cleaner 10 and would modify the displayed screens accordingly (e.g., add or remove content or screens). For another example, when the user registers the vacuum cleaner with the manufacturer for warranty or service, the app would auto-populate the fields for model number and serial number. The app may be programmed to cause the electronic device 132 to transmit the model number and serial number to a remote server, for example for analyzing or maintaining warranty, product, and/or consumer metrics.

At screen shot 255, the user can select whether to activate floor sense operation for the vacuum cleaner 10. The user can activate or deactivate floor sense operation using virtual toggle switch 260. The user can press virtual help button 265 to connect to user support (screen shot 270). At screen shot 270, the user can press virtual button 275 to access a frequency asked question section, press virtual button 280 to access a quick start instructional guide, press virtual button 285 to watch instructional videos, or press virtual button 290 to view an owner's manual. In one alternative, the user can press a virtual button to connect to a communication interface with a customer service representative or computer, such as a text, video, or virtual interaction with a person or computer trained to provide customer service. The application may be programmed to cause the electronic device to transmit the model number and serial number to the remote server of the customer service representative or computer.

Returning to screen shot 255, a home virtual button 290 can be pressed to return to screen shot 200. The user presses virtual button 300 to customize the vacuum cleaner 10. In the app shown, at screen shot 305, the user can select a type of carpet and/or a type of floor. Further discussion regarding customization of the vacuum cleaner 10 is provided below.

A maintenance virtual button 310 takes the user to screen shots 315 and 320. Screen shot 315 provides the user a time period for a next maintenance check. In screen shot 320, the user can select an area to check with respect to the vacuum cleaner 10 and can link to a server for receiving videos on how to check the respective area. Lastly, screen shot 325 provides a menu screen for the app.

In another implementation, the user can activate the vacuum by manipulating an operational switch of the user interface 116. The vacuum cleaner 10 will default into a floor sensor mode. During this operation, the brushroll motor 125 will run with a first percent of power (e.g., 100%) on carpet and a second percent of power (e.g., 10%) on hard floor. The vacuum cleaner 10 can use a floor type sensor such as a pressure sensor to determine whether the vacuum cleaner 10 is on carpet or on hard floor. For the first percent of power, the brushroll 94 may rotate at a first revolutions-per-minute (RPM) speed (e.g. 3500 RPM). The brushroll may rotate at a second RPM speed (e.g., 1000 RPM) for the second percent of power. A tachometer can be used to sense the brushroll speed, and a motor current sensor can be used to control the amount of current provided to the brushroll motor 128.

The user can turn off the floor sense operation via the app discussed with screen shot 305. When the floor sense is off, the brushroll motor will always run 100%, regardless of a type of surface.

As discussed with screen shot 305, the user can customize the vacuum cleaner 10. In the shown implementation, the user can select a pile height and a floor sensitivity. For the carpet height, the brushroll motor 128 runs with a first percent of power (e.g., 100%) when the user selection represents a high pile and the brushroll motor 128 runs with a third percent of power (e.g., 50%) when the user selection represents a low pile. Similarly, the brushroll motor runs with a second percent of power (e.g., 10%) when the user selection represents a durable floor and the brushroll motor runs with a fourth percent of power (e.g., 0%) when the user selection represents a delicate floor. The customized settings for the vacuum cleaner 10 can be reset or changed through the user. The illustrated embodiment represents user selections as high pile, low pile, durable floor, and delicate floor. However, other representations for the user-selected factor may be used, for example high agitation or low agitation.

In one implementation, the user can customize via the app the predetermined thresholds (i.e., pressure, torque, and/or current) that are associated with different floor types to represent the distinction between the user's floor surfaces. For example, if the user determines that the vacuum does not change performance when the vacuum passes from carpet to hard floor, it may be that the factory settings for the threshold between carpet and hard floor are not optimized for the user's floor types. The user via the app can raise or lower the threshold until the sensor 104 relating to the brushroll or sensor 108 to the floor type causes the controller to recognize the change in floor type.

It is also envisioned that, for some systems, the server 133 can customize settings for the user-selected factor and/or the parameters of the vacuum 10. The electronic device 132 can communicated with the server 133 (e.g., a server of the vacuum manufacturer or a service center) via a network 134. The server 133 can periodically or intermittently revise the user-selected factor. For example, the vacuum manufacturer, via the server 133, can revise the user-selected factor based on learned information related to the vacuum 10 or the model of the vacuum 10. Further, the vacuum manufacturer or a service center, via the server 133, the electronic device, and the application, can periodically or intermittently revise other parameters of the vacuum 10 (e.g., resulting from warranty returns, usage history of the model over time, information from a service call).

Various features and advantages of the invention are set forth in the following claims.

What is claimed is:

1. A vacuum cleaner comprising:
    a base defining a suction chamber;
    a user-manipulatable handle coupled to the base, the handle for moving the base with respect to a surface;
    a suction source driven by a suction motor;
    a brushroll driven by a brushroll motor;
    a transmitter and a receiver, both of which for wireless communication with a user-controlled electronic device; and
    a controller in communication with the transmitter and the receiver, the controller configured to
        control at least one of the suction motor and the brushroll motor at an initial value for an operational parameter corresponding to a selection,
        receive a communication from the user-controlled electronic device via the receiver, the communication providing an updated value for the operational parameter corresponding to the selection, and
        control at least one of the suction motor and the brushroll motor to the updated value.

2. The vacuum cleaner of claim 1, wherein the selection includes brushroll speed.

3. The vacuum cleaner of claim 2, wherein the selection includes brushroll speed including at least one of high agitation and low agitation.

4. The vacuum cleaner of claim 1, wherein the selection includes floor type.

5. The vacuum cleaner of claim 4, wherein the selection includes floor type including at least one of carpet and hard floor.

6. The vacuum cleaner of claim 4, wherein the selection includes floor type including at least one of high pile, low pile, durable floor, and delicate floor.

7. The vacuum cleaner of claim 1, wherein the controller controls the brushroll motor to the initial value by controlling at least one of power to the brushroll motor and revolutions per minute of the brushroll.

8. The vacuum cleaner of claim 1, wherein the base includes a base assembly having a floor nozzle, wherein the floor nozzle includes the suction chamber.

9. The vacuum cleaner of claim 1, wherein the vacuum cleaner is selected from the group consisting of an upright vacuum cleaner, a canister vacuum cleaner, a handheld vacuum cleaner, a utility vacuum cleaner.

10. The vacuum cleaner of claim 1, wherein the operational parameter is a revolutions per minute for the brushroll.

11. The vacuum cleaner of claim 1, further comprising
a brushroll sensor including a motor sensor, and
wherein the operational parameter is a parameter of the brushroll motor.

12. The vacuum cleaner of claim 1, wherein the operational parameter includes at least one of motor current, motor voltage, motor power, and revolutions per minute for the motor.

13. The vacuum cleaner of claim 1, further comprising
a floor sensor including a pressure sensor, and
wherein the operational parameter is a parameter related to an internal pressure within the vacuum.

14. The vacuum cleaner of claim 1, wherein the controller includes a transceiver and wherein the transceiver includes the transmitter and the receiver.

15. A non-transitory computer-readable medium comprising executable instructions for directing a processor of a user-controlled electronic device to perform a method comprising:
   establishing a communication channel with a user-manipulatable vacuum cleaner, the vacuum cleaner including
      a brushroll driven by a brushroll motor,
      a brushroll sensor configured to respond to an operational parameter related to the brushroll,
      a transmitter and a receiver, both of which for wireless communication with the electronic device, and
      a controller in communication with the transmitter, the receiver, and the brushroll sensor;
   communicating a control signal to operate the brushroll motor at an initial value for the operational parameter corresponding to a user selection;
   receiving a communication to revise the initial value to an updated value for the operational parameter corresponding to the user selection; and
   communicating a control signal to operate the brushroll motor at the updated value.

16. The non-transitory computer-readable medium of claim 15, wherein the executable instructions is an application programmed to reside in a non-transitory memory of the electronic device and wherein the method further comprises receiving inputs from a user-interface of the electronic device.

17. The non-transitory computer-readable medium of claim 16, wherein the method further comprises
   receiving an input via the user-interface of the electronic device for defining the updated value.

18. The non-transitory computer-readable medium of claim 16, wherein the step of receiving the communication to revise the initial value to the updated value for the operational parameter corresponding to the user selection comes from a remote server.

19. A vacuum cleaner comprising:
   a base defining a suction chamber;
   a user-manipulatable handle coupled to the base, the handle for moving the base with respect to a surface;
   a suction source driven by a suction motor;
   a brushroll driven by a brushroll motor;
   at least one of a brushroll sensor and a floor type sensor;
   a transmitter and a receiver, both of which for wireless communication with a user-controlled electronic device; and
   a controller in communication with the transmitter, the receiver, and the at least one of the brushroll sensor and the floor type sensor, the controller configured to
      determine a floor type by comparing a sensor signal from the at least one of the brushroll sensor and the floor type sensor to an initial predetermined threshold value,
      automatically operate at least one of the brushroll motor and the suction motor according to settings associated with the floor type that was determined according to the initial predetermined threshold value,
      receive a communication from the user-controlled electronic device via the receiver, the communication providing an updated predetermined threshold value,
      determine a floor type by comparing a sensor signal from the at least one of the brushroll sensor and the floor type sensor to the updated predetermined threshold value, and
      automatically operate at least one of the brushroll motor and the suction motor according to settings associated with the floor type that was determined according to the updated predetermined threshold value.

20. The vacuum cleaner of claim 19, wherein the brushroll sensor includes at least one of
   a tachometer for sensing a revolutions per minute value of the brushroll,
   a tachometer for sensing a revolutions per minute value of the brushroll motor,
   an electrical sensor for sensing an electrical parameter of the brushroll motor,
   a torque sensor for sensing a torque of the brushroll motor, and
   a pulse width modulation controller for the brushroll motor.

21. The vacuum cleaner of claim 19, wherein the floor type sensor includes at least one of
   a pressure sensor for sensing a pressure within the vacuum,
   a current sensor for sensing a current of the suction motor,
   a current sensor for sensing a current of the brushroll motor,
   a tachometer for sensing a revolutions per minute value of the brushroll, and
   a tachometer for sensing a revolutions per minute value of the brushroll motor.

* * * * *